United States Patent
Vamaraju et al.

(10) Patent No.: US 10,341,979 B2
(45) Date of Patent: Jul. 2, 2019

(54) SECURE FINE TIMING MEASUREMENT PROTOCOL

(71) Applicant: QUALCOMM Incorporated, San Diego, CA (US)

(72) Inventors: Santosh Vamaraju, San Jose, CA (US); Carlos Horacio Aldana, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 350 days.

(21) Appl. No.: 15/166,646

(22) Filed: May 27, 2016

(65) Prior Publication Data
US 2017/0149799 A1    May 25, 2017

Related U.S. Application Data

(60) Provisional application No. 62/257,932, filed on Nov. 20, 2015.

(51) Int. Cl.
*H04W 64/00* (2009.01)
*H04L 29/06* (2006.01)
(Continued)

(52) U.S. Cl.
CPC ........... *H04W 64/00* (2013.01); *G01S 5/0205* (2013.01); *G01S 5/14* (2013.01); *G01S 13/767* (2013.01);
(Continued)

(58) Field of Classification Search
CPC ... H04W 64/00; H04W 64/003; H04W 12/06; G01S 5/0205; G01S 5/14; G01S 13/878;
(Continued)

(56) References Cited

U.S. PATENT DOCUMENTS 5,825,890 A * 10/1998 Elgamal ................. H04L 29/06
713/151
2004/0117657 A1 * 6/2004 Gabor ................. H04L 63/0428
726/4
(Continued)

FOREIGN PATENT DOCUMENTS

WO         04071127         8/2004
WO      2014046758 A1      3/2014
(Continued)

OTHER PUBLICATIONS

International Search Report and Written Opinion—PCT/US2016/057803—ISA/EPO—dated Feb. 14, 2017—15 pgs.
(Continued)

*Primary Examiner* — Theodore C Parsons
(74) *Attorney, Agent, or Firm* — Bala Ramasamy; Hunter Clark PLLC

(57) ABSTRACT

Techniques for exchanging secure FTM messages are disclosed. An example of a wireless transceiver system for providing a secure Fine Timing Measurement (FTM) exchange includes a memory and a processor configured to obtain a initial-secure-token value and a secure-token-response value via an out-of-band signal, generate a FTM Request message including the initial-secure-token value, a transmitter to send the FTM Request message to a responding station, and a receiver to receive a FTM Response message including the secure-token-response value from the responding station, such that the at least one processor is configured to determine a Round Trip Time (RTT) value based at least in part on the FTM Response message.

19 Claims, 11 Drawing Sheets

(51) Int. Cl.
| | |
|---|---|
| *H04W 12/06* | (2009.01) |
| *G01S 5/02* | (2010.01) |
| *G01S 5/14* | (2006.01) |
| *G01S 13/76* | (2006.01) |
| *G01S 13/87* | (2006.01) |
| *H04L 29/12* | (2006.01) |
| *G01S 5/00* | (2006.01) |

(52) U.S. Cl.
CPC .......... *G01S 13/878* (2013.01); *H04L 63/126* (2013.01); *H04W 12/06* (2013.01); *H04W 64/003* (2013.01); *G01S 5/00* (2013.01); *G01S 5/0045* (2013.01); *G01S 5/0063* (2013.01); *H04L 61/6022* (2013.01); *H04L 63/107* (2013.01)

(58) Field of Classification Search
CPC .... G01S 13/767; G01S 5/0063; G01S 5/0045; G01S 5/00; H04L 63/126; H04L 61/6022; H04L 63/107
See application file for complete search history.

(56) References Cited

U.S. PATENT DOCUMENTS

| | | | |
|---|---|---|---|
| 2012/0243638 A1* | 9/2012 | Maltsev | H04W 72/0453 375/316 |
| 2014/0266907 A1 | 9/2014 | Taylor, Jr. et al. | |
| 2015/0222602 A1* | 8/2015 | Steiner | H04L 63/0428 713/168 |
| 2015/0257120 A1* | 9/2015 | Prechner | H04W 64/003 455/456.1 |
| 2015/0271776 A1* | 9/2015 | Michaelovich | H04W 64/00 455/456.1 |
| 2016/0226886 A1 | 8/2016 | Steiner | |
| 2017/0064505 A1* | 3/2017 | Eyal | H04W 4/023 |
| 2017/0064575 A1* | 3/2017 | Eyal | H04L 67/18 |
| 2017/0150354 A1 | 5/2017 | Marri et al. | |

FOREIGN PATENT DOCUMENTS

| | | |
|---|---|---|
| WO | 2015047234 A1 | 4/2015 |
| WO | 2015060884 A1 | 4/2015 |

OTHER PUBLICATIONS

Stanton, K.B. (Jul. 14, 2014). The use of 802.11 Timing Measurement by p802.1ASbt / p802.1AS-Rev Plus What is asCapable for 802.11 Ports Rev2. IEEE Draft presented at IEEE Plenary, San Diego, California, Jul. 2014. 7 pgs. XP068096289.

Stanton, K., & Aldana, C. (Mar. 9, 2015). Addition of p802.11-MC Fine Timing Measurement (FTM) to p802.1 ASRev: Tradeoffs and Proposals. Rev 0.9. IEEE Draft presented at IEEE 802.1 Plenary, Berlin, Germany, Mar. 2015. 22 pgs.

Stanton, K., & Aldana, C. (Mar. 9, 2015). Addition of p802.11-MC Fine Timing Measurement (FTM) to p802.1 ASRev: Tradeoffs and Proposals. Rev 0.10. IEEE Draft presented at IEEE 802.1 Plenary, Berlin, Germany, Mar. 2015. 22 pgs. XP068083830.

International Preliminary Report on Patentability—PCT/US2016/057803, The International Bureau of WIPO—Geneva, Switzerland, dated Oct. 25, 2017.

\* cited by examiner

SECURE FINE TIMING MEASUREMENT PROTOCOL

CROSS-REFERENCE TO RELATED APPLICATIONS

This application claims the benefit of and priority to provisional U.S. application Ser. No. 62/257,932, entitled "SECURE FINE TIMING MEASUREMENT PROTOCOL," filed Nov. 20, 2015, which is assigned to the assignee hereof and the content of which is incorporated herein by reference in its entirety.

FIELD OF THE INVENTION

Embodiments of the inventive subject matter generally relate to the field of wireless communication and, more particularly, to determining a position of a mobile device based on Fine Timing Measurement (FTM) protocols.

BACKGROUND

Various positioning techniques can be employed for determining the position of a wireless communication device (e.g., a wireless local area network (WLAN) device) based on receiving wireless communication signals. For example, positioning techniques can utilize one or more Fine Timing Measurement (FTM) sessions between a mobile device and one or more access points. The positioning techniques may utilize time of arrival (TOA), the round trip time (RTT) of wireless communication signals, received signal strength indicator (RSSI), or the time difference of arrival (TDOA) of the wireless communication signals to determine the position of a wireless communication device in a wireless communication network. These factors may be used in conjunction with the known positions of one or more stations in the wireless network to derive the location of the wireless communication device. In general, the FTM sessions are transmitted without encryption and thus are susceptible to man-in-the-middle attacks whereby a rouge station may monitor the session and spoof a responding station's address information. As a result, the rouge station may provide false time-of-arrival information to the requesting station and thereby negatively impact the resulting positioning results.

SUMMARY

An example of a wireless transceiver system for providing a secure Fine Timing Measurement (FTM) exchange according to the disclosure includes a memory, at least one processor operably coupled to the memory and configured to obtain an initial-secure-token value and a secure-token-response value via an out-of-band signal, generate a FTM Request message including the initial-secure-token value, a transmitter to send the FTM Request message to a responding station, and a receiver to receive a FTM Response message including the secure-token-response value from the responding station, such that the at least one processor is configured to determine a Round Trip Time (RTT) value based at least in part on the FTM Response message.

Implementations of such a wireless transceiver system may include one or more of the following features. The FTM Request message including the initial-secure-token value may include a Media Access Control (MAC) header frame with a secure token information element. The FTM Request message including the initial-secure-token value may include a FTM parameter field with a secure token information element. The secure token information element may be appended on to the FTM parameter field. The initial-secure-token value and the secure-token-response value may be equal values. The initial-secure-token value and the secure-token-response value may be randomized. The at least one processor may be further configured to determine a position of the wireless transceiver system based at least in part on the RTT value.

An example of a method for participating in a secure Fine Timing Measurement (FTM) exchange according to the disclosure includes obtaining an authenticated-source Media Access Control (MAC) address and an authenticated-destination MAC address, generating a FTM Request message including the authenticated-source MAC address and the authenticated-destination MAC address, sending the FTM Request message to a responding station, receiving a FTM Response message including the authenticated-source MAC address and the authenticated-destination MAC address from the responding station, and determining a Round Trip Time (RTT) value based at least in part on the FTM Response message.

Implementations of such a method may include one or more of the following features. Obtaining the authenticated-source MAC address and the authenticated-destination MAC address may include receiving the authenticated-source MAC address and the authenticated-destination MAC address via an out-of-band exchange with a position server. Obtaining the authenticated-source MAC address and the authenticated-destination MAC address may include performing a randomization function on an original source MAC address and an original destination MAC address. At least one FTM parameter field information element may be an input to the randomization function. The FTM parameter field information element may be a Partial Timing Synchronization Function (PTSF) field. A Time of Departure (TOD) or a Time of Arrival (TOA) of the FTM Response message may be used an input to the randomization function. A secure token may be received via an out-of-band exchange with a position server. Obtaining the authenticated-source MAC address and the authenticated-destination MAC address may include performing a randomization function on an original source MAC address and an original destination MAC address, wherein the secure token is an input to the randomization function. Obtaining the authenticated-source MAC address and the authenticated-destination MAC address may include exchanging MAC address in a vendor information element.

An example of an apparatus for providing a secure Fine Timing Measurement (FTM) exchange according to the disclosure includes means for obtaining an initial-secure-token value and a secure-token-response value via an out-of-band signal, means for generating a FTM Request message including the initial-secure-token value, means for sending the FTM Request message to a responding station, means for receiving a FTM Response message including the secure-token-response value from the responding station, and means for determining a Round Trip Time (RTT) value based at least in part on the FTM Response message.

An example of a non-transitory processor-readable storage medium comprising instructions for participating in a secure Fine Timing Measurement (FTM) exchange includes code for obtaining an authenticated-source Media Access Control (MAC) address and an authenticated-destination MAC address, code for generating a FTM Request message including the authenticated-source MAC address and the authenticated-destination MAC address, code for sending the FTM Request message to a responding station, code for receiving a FTM Response message including the authenticated-source MAC address and the authenticated-destination MAC address from the responding station, and code for determining a Round Trip Time (RTT) value based at least in part on the FTM Response message.

An example of a wireless transceiver system for participating in a secure Fine Timing Measurement (FTM) exchange includes a memory, at least one processor operably coupled to the memory and configured to obtain an authenticated-source Media Access Control (MAC) address and an authenticated-destination MAC address, generate a FTM Request message including the authenticated-source MAC address and the authenticated-destination MAC address, send the FTM Request message to a responding station, receive a FTM Response message including the authenticated-source MAC address and the authenticated-destination MAC address from the responding station, and determine a Round Trip Time (RTT) value based at least in part on the FTM Response message.

Implementations of such a wireless transceiver system may include one or more of the following features. The at least one processor may be configured to obtain the authenticated-source MAC address and the authenticated-destination MAC address via an out-of-band exchange with a position server. The at least one processor may be configured to perform a randomization function on an original source MAC address and an original destination MAC address to obtain the authenticated-source MAC address and the authenticated-destination MAC address. At least one FTM parameter field information element may be an input to the randomization function. The at least one FTM parameter field information element may be a Partial Timing Synchronization Function (PTSF) field. At least one of a Time of Departure (TOD) or a Time of Arrival (TOA) of the FTM Response message may be an input to the randomization function. The at least one processor may be configured to obtain the authenticated-source MAC address and the authenticated-destination MAC address by receiving a secure token via an out-of-band exchange with a position server and performing a randomization function on an original source MAC address and an original destination MAC address, such that the secure token is an input to the randomization function. The at least one processor is configured to exchange a MAC address in a vendor information element to obtain the authenticated-source MAC address and the authenticated-destination MAC address.

Items and/or techniques described herein may provide one or more of the following capabilities, as well as other capabilities not mentioned. Two stations may participate in a Fine Timing Measurement (FTM) session. A secure-token may be included in the initial FTM Request message (iFTMR). The responding station may include a secure-token-response in the iFTM. The initiating and responding stations may authentication each other during the FTM session. The secure-token and secure-token-response may form the basis of a per-frame generation of a new source Media Access Control (MAC) address and a new destination MAC address for the participating stations. The secure-token and secure-token-response may form the basis of a per-FTM session generation of a new source and destination MAC addresses for the participating stations. The source and destination MAC address may be randomized by out-of-band methods. The secure-tokens may be replaced by the use of combinations of FTM values such as the Partial Timing Synchronization Function (PTSF), Time of Deliver (TOD), and Time of Arrival (TOA). In an example, some or all of the frames in the FTM messages may be encrypted. A Round Trip Time (RTT) may be computed based on the FTM session. Position information may be derived from the RTT information. The likelihood of a man-in-the-middle attack may be reduced. Further, it may be possible for an effect noted above to be achieved by means other than that noted, and a noted item/technique may not necessarily yield the noted effect.

DETAILED DESCRIPTION

Figure 1A:
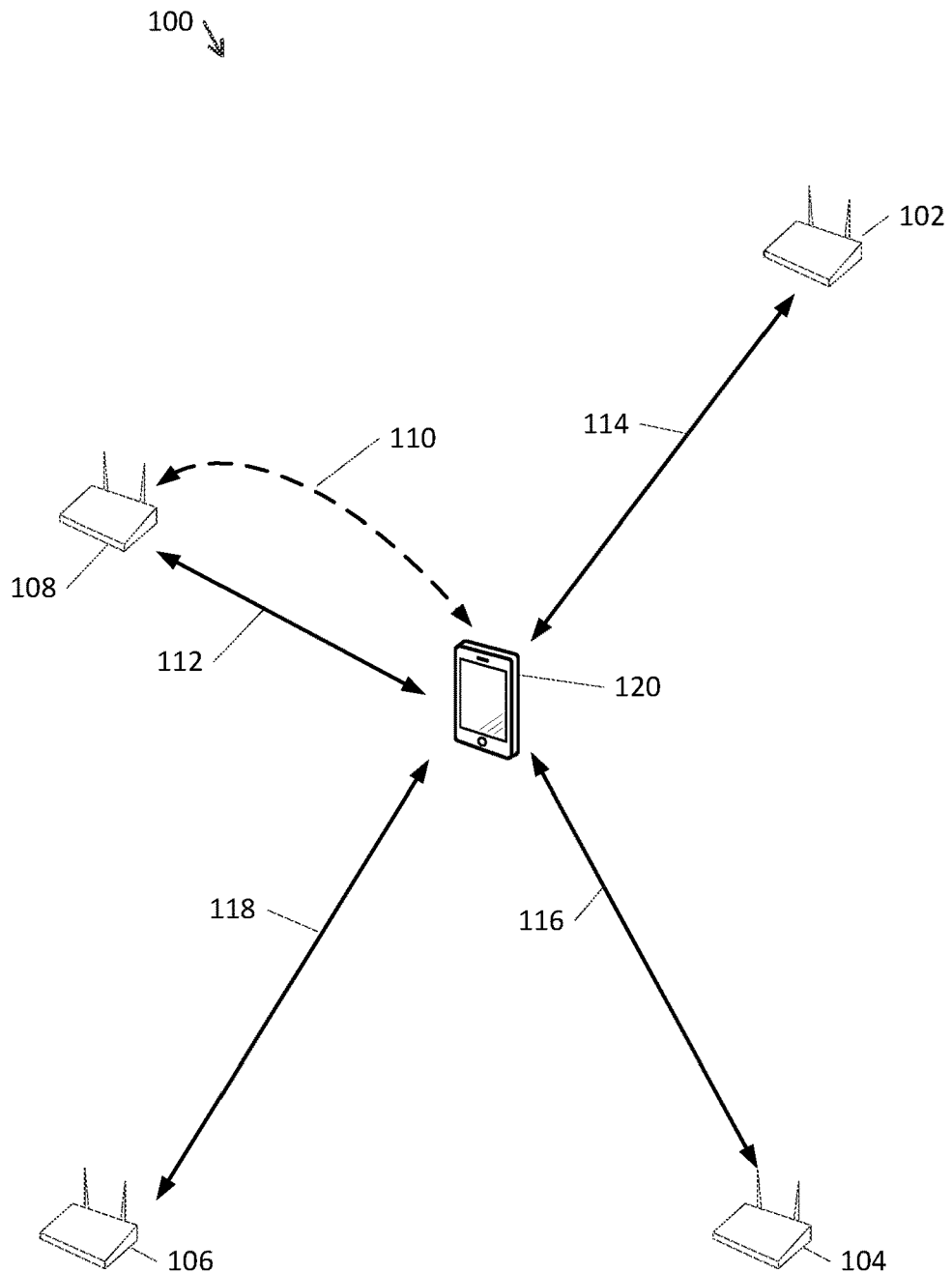
FIG. 1A is an example block diagram of a wireless local area network for providing a secure FTM protocol.

The description that follows includes exemplary systems, methods, techniques, instruction sequences, and computer program products that embody techniques of the present inventive subject matter. However, it is understood that the described embodiments may be practiced without these specific details. For instance, although examples utilize Fine Timing Measurement (FTM) message frames under IEEE 802.11, embodiments are not so limited. In other embodiments, the positioning information may be provided by other wireless standards and devices (e.g., WiMAX devices). In other instances, well-known instruction instances, protocols, structures, and techniques have not been shown in detail in order not to obfuscate the description.

In wireless communication networks, determining the position of an electronic device with wireless communication capabilities (e.g., within an indoor or outdoor environment) can be a desired feature for users of the communication device (e.g., mobile phone users) and operators of the wireless communication network. In some systems, round-trip time (RTT) techniques can be implemented for determining the position of the communication device. In general, a communication device can transmit a request message to multiple access points and can receive a response message from each of the access points. The range between the communication device and each of the access points can be determined by measuring the round trip time between the request messages and the corresponding response messages. The position of the communication device can be determined by comparing the RTT information to the known locations of the access points. In some systems, time difference of arrival (TDOA) techniques can be implemented for determining the position of the communication device. For example, the communication device can determine its position based on the difference between the ranges from each of the access points to the communication device. A mobile communication device may initiate RTT positioning operations (or the TDOA positioning operations) by transmitting a request message to one or more access points. The use of a mobile phone and access points are provided to simplify the technical explanation and thus are not a limitation as request messages and response may be sent between access points (i.e., without a mobile phone). Communication devices and access points may be generally referred to as stations such as an initiating station and a responding station.

In an example, a FTM Protocol (e.g., 802.11mc D4.3 section 10.24.6) may enable two stations to exchange round trip measurement frames (e.g., FTM frames). An initiating station (e.g., STA 1) computes the round-time by recording the TOA (i.e., t2) of the FTM frame from a responding station (e.g., STA 2) and recording the TOD of an acknowledgement frame (ACK) of the FTM frame (i.e., t3). The STA 2 records TOD of the FTM frame (i.e., t1) and the TOA of the ACK received from STA 1 (i.e., t4). The RTT is thus computed as:

$$RTT=[(t4-t1)-(t3-t2)]$$

This frame exchange may be prone to a man-in-the-middle attack via impersonation and other methods affecting the trust of the stations participating in the exchange. For example, a rogue station may monitor the air for iFTM-requests, and then may be configured to send FTM frames to an innocent initiating station by spoofing the responding station's Media Access Control (MAC) address. The rogue station may send an ACK message to the responding stations FTM frames thus causing the responding-station to record a false time-of-arrival of the ACK. Such man-in-the-middle attacks may impact the over-all usability of the FTM protocol. This is particularly relevant for high-security applications that are built on top of the FTM protocol (e.g. geo-fencing).

Man-in-the-middle attacks may be eliminated, or at least substantially hindered, by the methods and apparatus described herein. In an example, secure-token element may be included in an initial FTM request message (iFTMR) and a secure-token-response element may be included in the initial FTM response (iFTM). The participating stations may then authenticate one another during the FTM session. The secure-token and/or secure-token-response can form the basis of a per-frame and/or per-secure FTM session (e.g., based on a desired-level of security). In an example, the secure-tokens may be realized by generating new source MAC address and destination MAC address combinations for the participating stations. The participating stations may implement via hardware and/or software similar authentication algorithms to authenticate (e.g., recognize, deduce) one another's authenticated-source and authenticated-destination MAC address combinations. The participating stations may use the generated MAC address combination as the source and destination MAC addresses of the frames they transmit. For example, an initiating station may program its hardware to authenticate (e.g., accept) FTM messages from an authenticated-source MAC address. A responding station may use the authenticated-source MAC address to transmit an FTM message to the authenticated-destination MAC address and program its hardware to authenticate (e.g., accept) ACK frames from the authenticated-destination MAC address. The initiating station may program its hardware to send an ACK message to FTM messages received from the expected source MAC address. The use of such a MAC address combination may greatly diminish the threat of a man-in-the-middle attack because the rouge station is unlikely to determine the source and destination of the FTM session, and thus it will be unable impersonate either station.

In an embodiment, the authenticated-source MAC address and the authenticated-destination MAC address may be randomized by out-of-band methods. For example, a randomization factor or function may be used to generate on-the-fly MAC addresses. The FTM and ACK frames may be transmitted and received based on the corresponding randomized MAC addresses. In an embodiment, the secure-tokens may be replaced by the use of combinations of one or more of the PTSF, TOD, TOA values. Such combinations may then be used to deduce the MAC addresses needed to authenticate the participating stations. Examples of such combinations include, but are not limited to, the following:

M'=Secure_token XOR M (XOR can also be replaced by AND)

M'=PTSF XOR (LSB(16) of M) (XOR can also be replaced by AND)

M'=PTSF XOR (LSB(16) of M) XOR TOD XOR TOA (XOR can also be replaced by AND)

Where M' is the authenticated MAC address generated from the original MAC address M.

Referring to FIG. 1A, an example block diagram of a wireless communication network 100 for providing a secure FTM protocol is shown. The wireless communication network 100 includes four access points 102, 104, 106, 104 and a client station 120. The access points 102, 104, 106, 108 may be advanced WLAN access points capable of determining their own positions (e.g., a self-locating access point). The access points may be configured to communicate with one or more other access points in the wireless communication network 100 (e.g., within the communication range of one another). In some implementations, access points can be arranged such that one access point can be designated as a master access point, and the other access points can be designated as target access points. The client station 120 can be any suitable electronic device (e.g., a notebook computer, a tablet computer, a netbook, a mobile phone, a gaming console, a personal digital assistant (PDA), inventory tag, etc.) with WLAN communication capabilities. Furthermore, in FIG. 1A, the client station 120 is within the communication range of one or more access points 102, 104, 106, 108.

The client station 120 may participate in an out-of-band or other pre-negotiated exchange with one or more access points. For example, the client station 120 and the trusted access point 108 may be part of a trust group formed via a cloud service (e.g., Google AP, iCloud). The client station 120 and the trusted access point 108 are configured to establish an out-of-band exchange 110. The content of the out-of-band exchange 110 may include secure-tokens, randomization factors and functions, or other security information to enable secure FTM exchanges. In an example, the FTM exchanges may be encrypted and the security information received via the out-of-band exchange 110 may include corresponding public and/or private keys. Upon receipt of the security information, the client station 120 may be configured to initiate one or more FTM sessions with the access points 102, 104, 106, 108. For example, a first FTM session 112 may occur between the client station 120 and the trusted access point 108. The client station 120 may determine position information (e.g., RTT and/or TDOA information) based on the first FTM session 112. The client station 120 may subsequently initiate a second FTM session 114 with a second access point (e.g., access point 102) based on the secure information included in the out-of-band exchange 110. The second FTM session 114 need not be preceded by another out-of-band exchange with the second access point 102. The client station 120 may then determine position information (e.g., RTT and/or TDOA information) based on the second FTM session 114. Additional FTM sessions may occur based on the security information received during the out-of-band exchange 110. The client station 120 may initiate a third FTM session 116 with a third access point (e.g., access point 104), and a fourth FTM session 118 with a fourth access point (e.g., access point 106).

In some implementations, the client station 120 can use the access point position information (e.g., latitude, longitude, altitude), in combination with the TDOA timing information, and/or the RTT timing information to construct a "positioning equation" in terms of the range between the client station 120 and each of the predetermined number of access points 102, 104, 106, 108. For example, on determining the access point position information, the TDOA timing information, and the RTT timing information associated with three target access points, the client station 120 can solve three positioning equations to determine a three-dimensional position of the client station 120. It is noted that in other implementations, the client station 120 can determine a position based on the access point position information, the TDOA timing information, and the RTT timing information associated with any suitable number of access points. For example, a position can be based on two independent positioning equations from the access point position information, the TDOA timing information, and the RTT timing information associated with two target access points to determine a two-dimensional position of the client station 120.

Figure 1B:
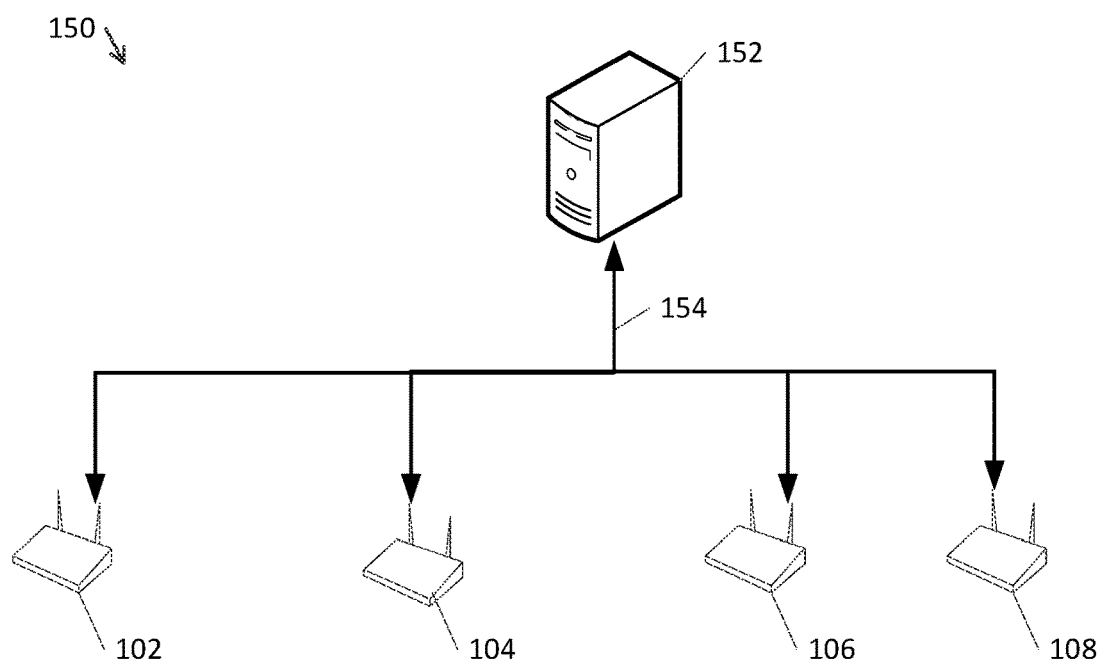
FIG. 1B is an example network diagram of a wireless local area communication network including a position server.

Referring to FIG. 1B, an example network diagram of a wireless local area network including a position server is shown. The network 150 includes access points 102, 104, 106, 108, a position server 152, and a communication path 154. The position server 152 is a computing device including at least one processor and a memory and is configured to execute computer executable instructions. For example, a position server 152 comprises a computer system including a processor, non-transitory memory, disk drives, a display, a keyboard, a mouse. The processor is preferably an intelligent device, e.g., a personal computer central processing unit (CPU) such as those made by Intel® Corporation or AMD®, a microcontroller, an application specific integrated circuit (ASIC), etc. The memory includes random access memory (RAM) and read-only memory (ROM). The disk drives include a hard-disk drive, a CD-ROM drive, and/or a zip drive, and may include other forms of drives. The display is a liquid-crystal display (LCD) (e.g., a thin-film transistor (TFT) display), although other forms of displays are acceptable, e.g., a cathode-ray tube (CRT). The keyboard and mouse provide data input mechanisms for a user. The position server 152 stores (e.g., in the memory) processor-readable, processor-executable software code containing instructions for controlling the processor to perform functions described herein. The functions may assist in the implementation of providing a secure FTM protocol. The software can be loaded onto the memory by being downloaded via a network connection, uploaded from a disk, etc. Further, the software may not be directly executable, e.g., requiring compiling before execution. The access points 102, 104, 106, 108 are configured to communicate with the position server 152 to exchange position information via the communication path 154. The communication path 154 can be a wide area network (WAN) and can include the internet. The position server 152 can include a data structure (e.g., relational database, flat files) to store secure-tokens, randomization factors and functions, or other security information to enable secure FTM exchanges. In an example, the position server 152 may include additional station information such as position information (e.g., lat./long., x/y), RTT information, SIFS information, and other information associated with a station (e.g., SSID, MAC address, uncertainty value, coverage area, etc.). An access point (e.g., 102, 104, 106, 108) may communicate with the position server 152 and can retrieve, for example, security information, SIFS information and RTT information for use in client station positioning solutions. The configuration of the position server 152 as a remote server is exemplary only and not a limitation. In an embodiment, the position server 152 may be connected directly to an access point, or the functionality may be included in an access point. More than one position server may be used. The position server 152 can include one or more databases containing security information associated with other stations on additional networks. In an example, the position server 152 is comprised of multiple server units.

Figure 2:
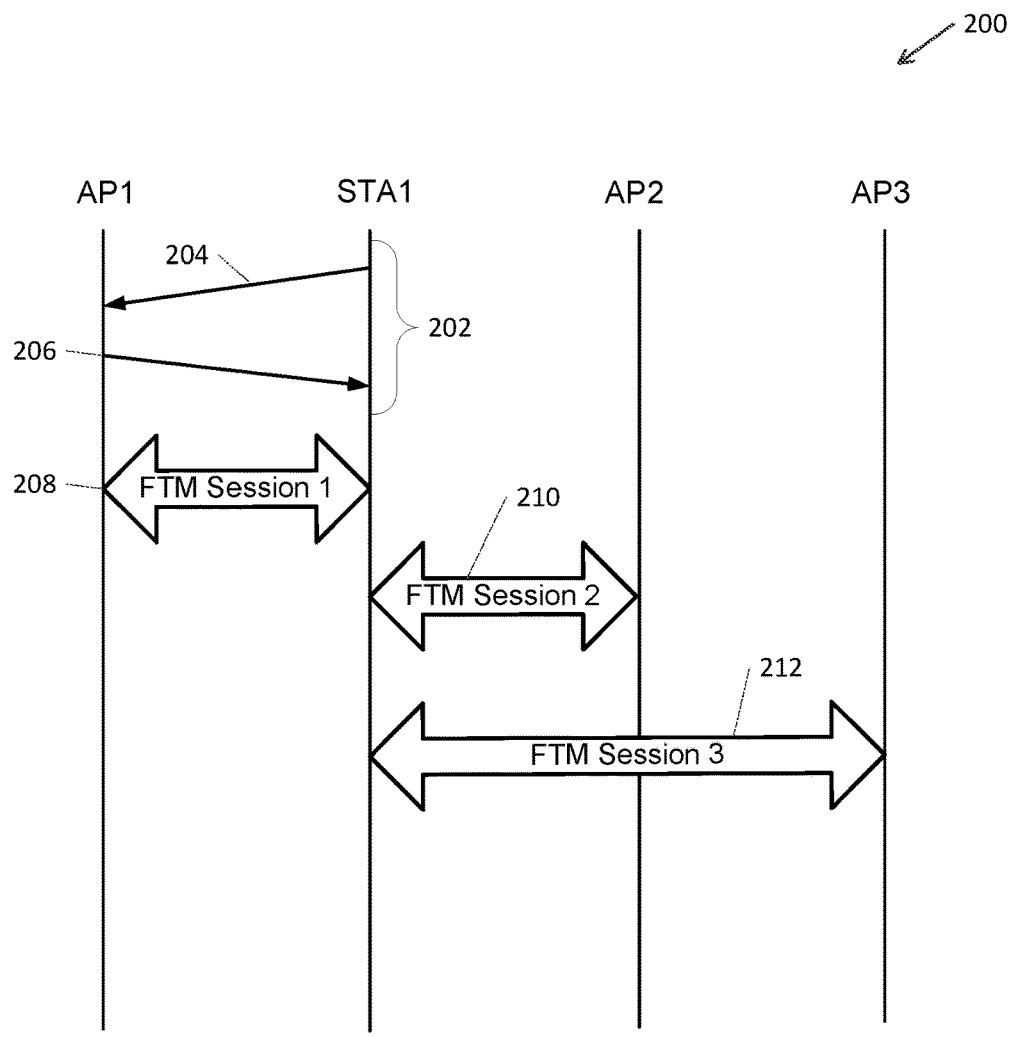
FIG. 2 is a conceptual diagram of the use of multiple secure FTM sessions.

Referring to FIG. 2, a conceptual diagram 200 of the use of multiple secure FTM message exchanges is shown. The conceptual diagram 200 includes three access points (e.g. AP1, AP2, AP3) and a mobile device (e.g., STA1). In an example, the mobile device may initiate an out-of-band exchange 202 with AP1 by connecting with trusted group 204 and receiving security information 206. The security information may include elements such as secure-tokens, randomization factors or functions, look-up-tables (e.g., to correlate real and authenticated MAC addresses), cryptographic keys, or other information to enable secure FTM exchanges. The security information may persist on the position server 152 and it may be accessible via the communication path 154. STA1 may utilize the security information to initiate a first secure FTM session 208 with AP1. STA 1 may also use the security information 206 in initiate a second secure FTM session 210 with AP2, and a third secure FTM session 212 with AP3. The order to the first, second and third secure FTM sessions is exemplary only. In an example, the order of the secure FTM sessions may be based on other network information such as station beacon broadcasts or an Access Network Query Protocol (ANQP) query and response (e.g., an ordered neighbor report).

Figure 3:
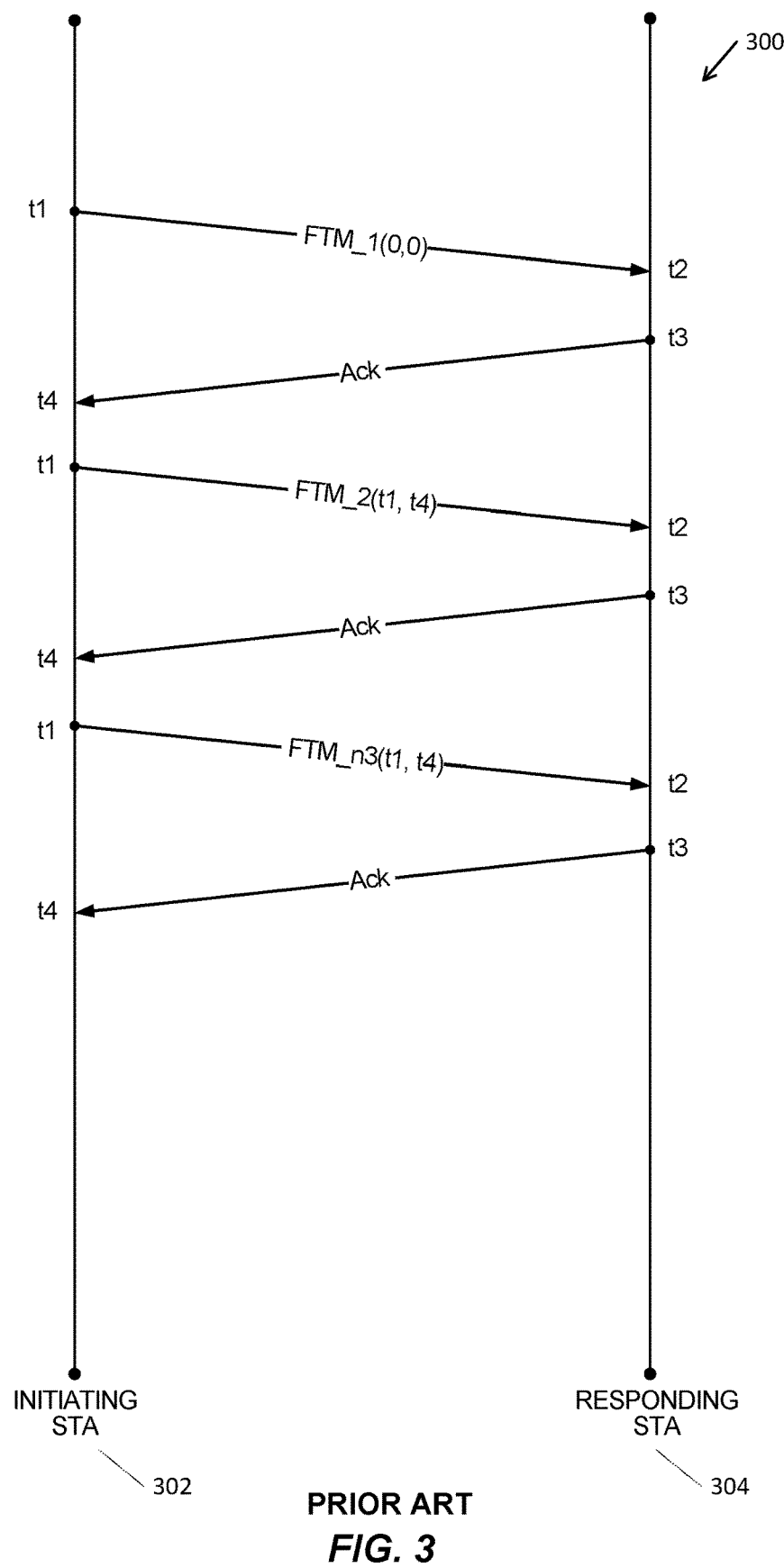
FIG. 3 is an example message flow in an FTM session in the prior art.

Referring to FIG. 3, an example of a conceptual diagram of a Fine Timing Measurement (FTM) session 300 is shown. The general approach includes an initiating station 302 and a responding station 304. The initiating station 302 and the responding station 304 may be any of the client station 120 and the access points 102, 104, 106, 108. As a general distinction, an access point may serve multiple stations but the terms as used herein are not so limited. The relevant operations described herein may be performed on both stations and access points. The FTM session may allow the initiating station 302 to obtain its range with the responding station 304. The initiating station 302 may perform this procedure with multiple other stations (e.g., access points) in order to obtain its location. An FTM session is an instance of a fine timing measurement procedure between the initiating station 302 and the responding station 304, and may include the associated scheduling and operational parameters of that instance. An FTM session is generally composed of a negotiation, a measurement exchange, and a termination. An access point may participate in multiple concurrent FTM sessions. Concurrent FTM sessions may occur with responding stations that are members of different Basic Service Sets (BSS) and possibly different Extended Service Sets (ESS), or possibly outside of a BSS, each session using its own scheduling, channel and operational parameters. A responding station may be required to establish overlapping FTM sessions with a large number of initiating stations (e.g. such as an access point providing measurements to multiple other client stations at stadium, a mall or a store). In an example, a client station may have multiple ongoing FTM sessions on the same or different channels with different responding access points, while being associated to a particular access point for the exchange of data or signaling. In an example, the client station is not associated with any access point. To support the constraints of both the access points, during the negotiation the initiating station 302 initially requests a preferred periodic time window allocation. The responding station 304 subsequently responds by accepting or overriding the allocation request based on its resource availability and capability. Since some of the initiating station's 302 activities may be non-deterministic and may have higher precedence than the FTM session (e.g. data transfer interaction with an associated AP), a conflict may prevent the initiating station 302 from being available at the beginning of a burst instance determined by the responding station 304. In such an example, the initiating station 302 may establish sessions with the responding station 304, and another station on different channels. Each of the sessions' burst periodicity may be different and each of the stations' clock offsets may differ. Thus, over time, some temporal conflicts may occur. To overcome this, during each burst instance the initiating station may indicate its availability by transmitting a trigger frame in the form of a Fine Timing Measurement Request frame. During each burst instance, the responding station transmits one or more fine timing measurement frames as negotiated.

Figure 4:
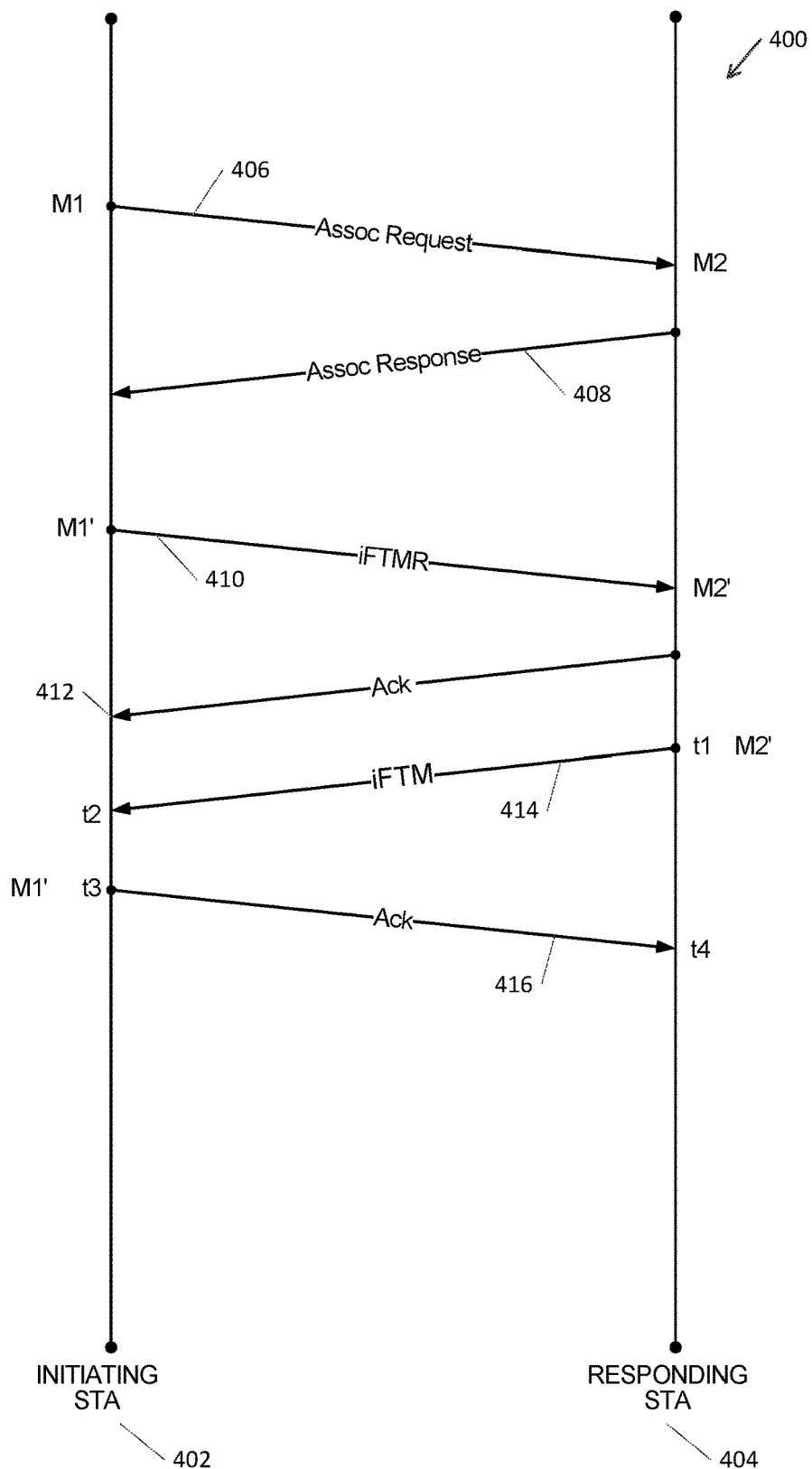
FIG. 4 is an example message flow in a secure FTM session.

Referring to FIG. 4, with further reference to FIG. 3, a message flow in a secure FTM session 400 is shown. An initiating station 402 may provide an association request message 406 to a responding station 404. In an example, the initiating station 402 may send a probe request message to a responding station 404. The association request 406 may include the original MAC address (M1) assigned to the initiating station 402 and the original MAC address (M2) assigned to the responding station 404. In an example, upon receiving the association request message 406, the responding station 404 may be configured to generate an authenticated-source MAC address (M1') and an authenticated-destination MAC address (M2'). In an example, generating the authenticated MAC addresses includes receiving security information from a position server or other out-of-band source. The responding station 404 is configured to provide an association response message 408 (or a probe response message) based on the original MAC addresses (e.g., M1 and M2). The association response message 408 may include an indication (e.g., flag, information element) to indicate that the responding station is configured to participate in a secure FTM session.

The initiating station 402, upon receipt of the association response 408 (or a probe response), may be configured to obtain or generate the authenticated-source MAC address (M1') and the authenticated-destination MAC address (M2'). The authenticated MAC addresses may include secure-tokens. The original MAC addresses may be randomized based on hardware and/or software elements operating on both stations (e.g., as obtained from an out-of-band source). In an embodiment, the secure-tokens may be replaced or augmented by the use of combinations of one or more of the PTSF, TOD, TOA values. Other information elements and logical operations may also be used (e.g., M1'=PTSF XOR (LSB(16) of M1) XOR TOD XOR TOA, and other functions as previously described). The authenticated MAC address may be based on look-up-tables, or on other previously negotiated cryptographic functions (e.g., hashing functions). The initiating station 402 is configured to initiate a secure FTM session by sending an iFTMR message 410 including the authenticated-source MAC address (M1') and the authenticated-destination MAC address (M2'). The responding station 404 provides an Acknowledgment (Ack) message 412 using the authenticated MAC addresses (e.g., M1', M2'). The responding station 404 may provide an iFTM message 414 and the initiating station 402 may provide the corresponding acknowledgment 416 using the authenticated MAC addresses. RTT values may be calculated as previously described by utilizing the values for t1, t2, t3 and t4.

Figure 5A:
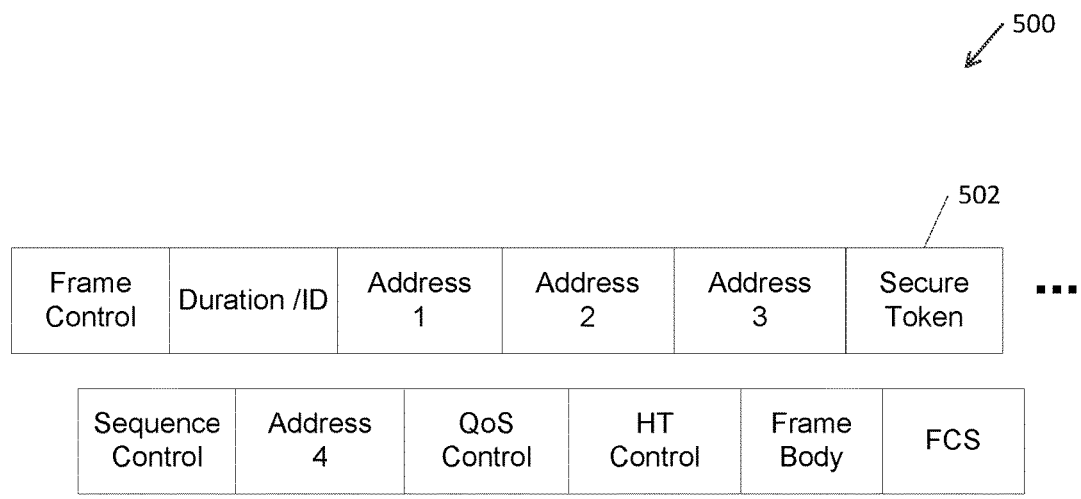
FIG. 5A is an example MAC frame with a secure token information element.

Referring to FIG. 5A, an example MAC frame 500 with a secure token information element (IE) is shown. The MAC frame 500 may generally comply with industry standards (e.g., IEEE 802.11 REVmc, section 8.2), with the addition of a secure token IE 502. The secure token IE may be a flag (e.g., bit) indicating that a station is utilizing authenticated MAC addresses. The secure token IE 502 may include a code (e.g., 2, 4, 8 bits) to indicate one or more functions for generating and/or decoding authenticated MAC addresses. That is, the stations may include hardware and software for generating and decoding authenticated MAC addresses by multiple different processes and the secure token IE 502 indicates which of the multiple processes may be used. In an example, the secure token IE 502 may represent a unique secure identifier (e.g., 128, 256 bits) which may be authenticated by the initiating and responding stations.

Figure 5B:
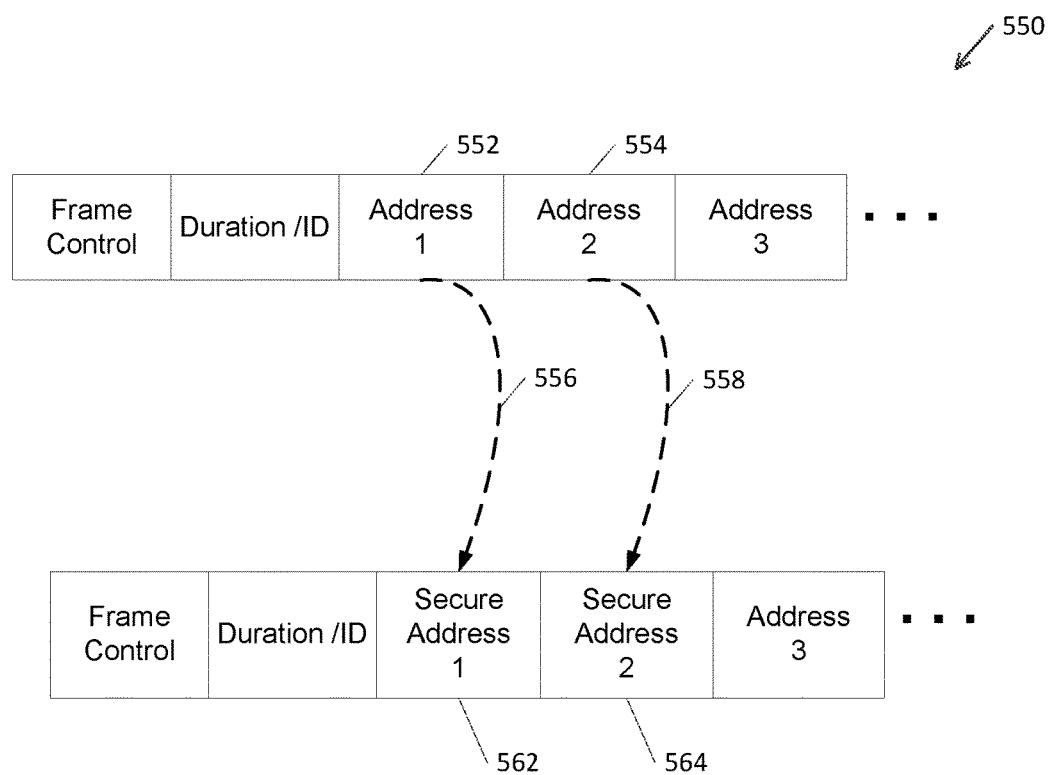
FIG. 5B is an example MAC frame with secure address information elements.

Referring to FIG. 5B, an example MAC frame 550 with secure address information elements is shown. The original address elements include the original address 1 element 552 (e.g., M1) and the original address 2 element 554 (e.g., M2). The corresponding secure addresses (e.g., authenticated addresses) may be derived based on one or more randomization factors or other functions. For example, a first function 556 may be used to transform the address 1 element 552 into the secure address 1 element 562 (e.g., M1'). Similarly, a second function 558 may be used to transform the address 2 element 554 to the secure address 2 element 564 (e.g., M2'). The first function 556 and the second function 558 may be the same or different functions. In an embodiment, the selection of the first and or second functions may be based on the value of the secure token IE 502. The first and second function 556, 558 may be included in security information obtained from an out-of-band or other pre-negotiated method. A non-limiting list of example functions includes:

Function 1: M'=Secure_token XOR M
Function 2: M'=Secure_token AND M
Function 3: M'=PTSF XOR (LSB(16) of M)
Function 4: M'=PTSF AND (LSB(16) of M)
Function 5: M'=PTSF XOR (LSB(16) of M) XOR TOD XOR TOA
Function 6: M'=PTSF AND (LSB(16) of M) XOR TOD XOR TOA Function 7: M'=PTSF AND (LSB(16) of M) AND TOD XOR TOA Function 8: M'=PTSF AND (LSB(16) of M) AND TOD AND TOA Function 9: M'=PTSF XOR (LSB(16) of M) XOR TOD AND TOA Function 10: M'=PTSF XOR (LSB(16) of M) AND TOD XOR TOA The list of functions is exemplary only, and not a limitation. Other functions may be used. In an example randomized look-up tables or hashing functions may be used to generate the authenticated MAC addresses. In an embodiment, the look-up tables may be include cryptographic hash functions (e.g., SHA-1) corresponding to the original MAC addresses. The look-up tables and functions may be provided to the stations via out-of-band exchanges between a server and the stations to preserve their integrity/confidentiality.

Figure 6A:
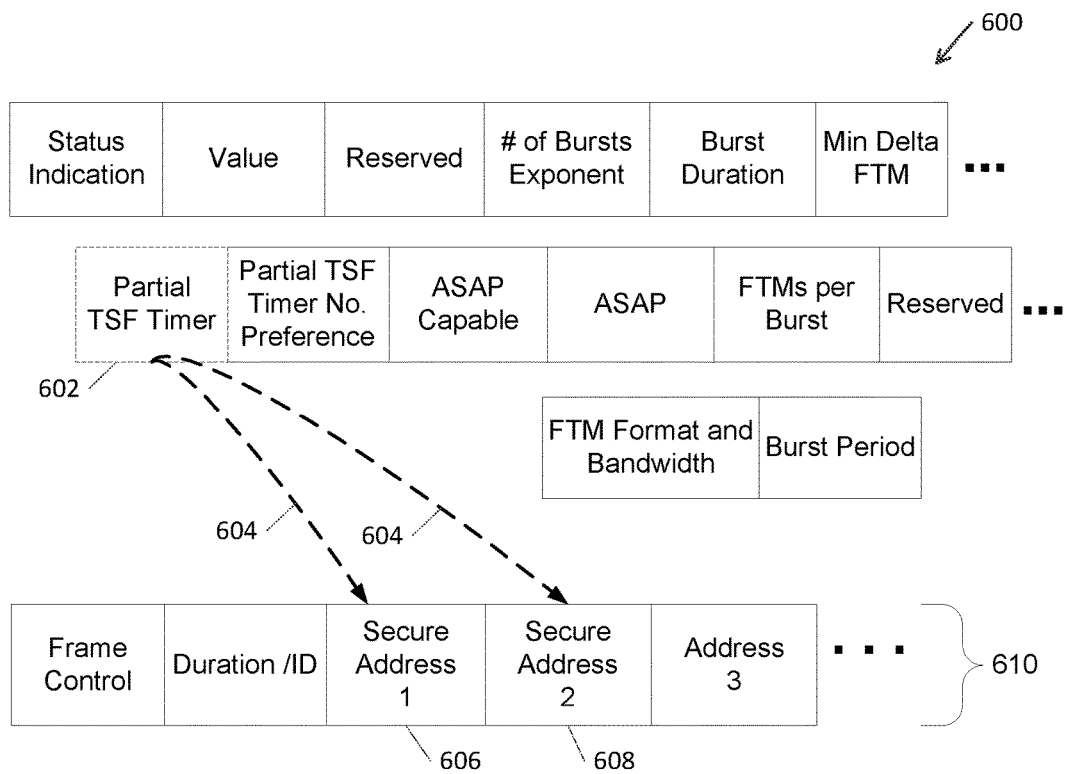
FIG. 6A is an example of MAC frame with secure address based on a Partial TSF value.

Referring to FIG. 6A, an example of MAC frame 610 with secure addresses based on a Partial TSF value is shown. The Partial TSF timer value 602 is included in a Fine Timing Measurement Parameters element 600 (e.g., IEEE 802.11 REVmc, FIG. 8-570). One or more functions 604 may be used to generate one or more secure addresses. In an example, the one or more functions 604 may utilize the Partial TSF timer value 602 as a variable to compute the secure address 1 606 and the secure address 2 608. For example, a computer processor may implement Functions 3 through 10 described above to utilize the Partial TSF timer value 602 (e.g., PTSF) for calculating a secure (e.g., authenticated) MAC address.

Figure 6B:
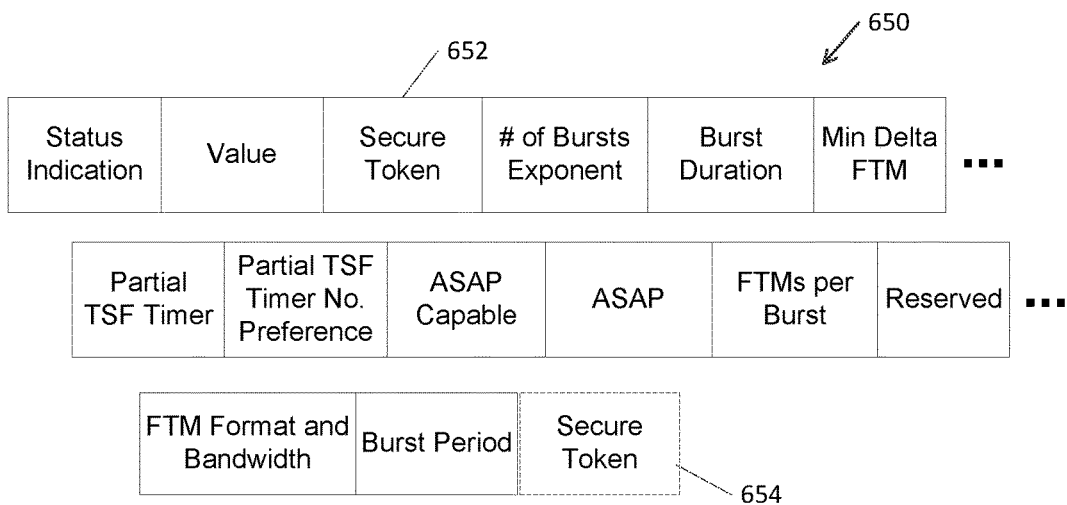
FIG. 6B is an example of an FTM element with a secure token.

Referring to FIG. 6B, a Fine Timing Measurement Parameter element 650 with a secure token is shown. In general, the Fine Timing Measurement Parameter element 650 is based on industry standards (e.g., IEEE 802.11 REVmc, FIG. 8-570) with the addition of a secure token information element. In an example, the secure information element 652 may utilize a Reserve element in existing FTM parameters elements (i.e., using an existing information element rather than adding an additional information element to the standard). In another example, a secure token information element 654 may be added/appended to the industry standard frame (as shown in dashed lines). In an example, both the existing Reserve information element and the appended information element may be used.

Figure 7A:
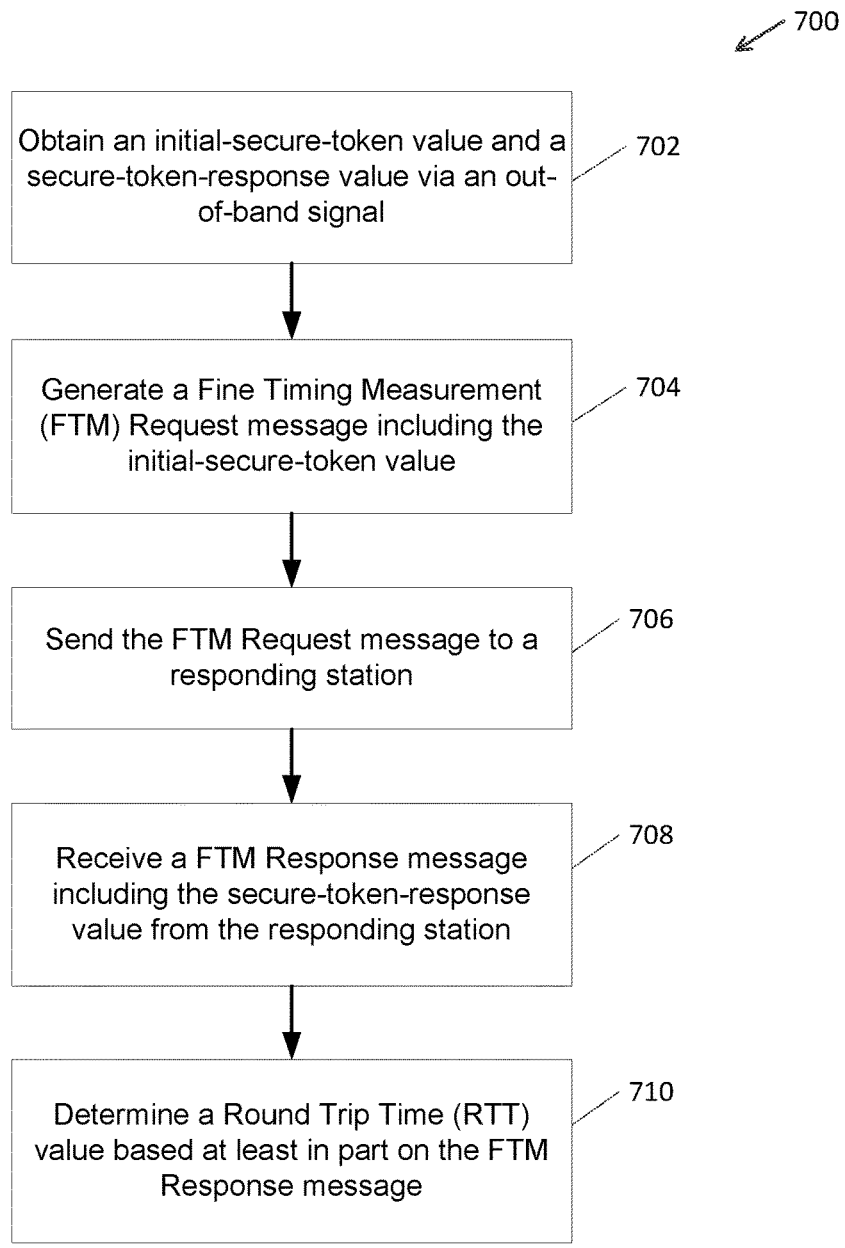
FIG. 7A is flow diagram of a process for exchanging FTM messages including secure-tokens.

In operation, referring to FIG. 7A, with further reference to FIG. 4, a process 700 for exchanging FTM messages including secure tokens includes the stages shown. The process 700, however, is exemplary only and not limiting. The process 700 may be altered, e.g., by having stages added, removed, or rearranged.

At stage 702, an initiating station 402 is configured to obtain an initial-secure-token value and a secure-token-response value via an out-of-band signal. The initiating station may establish an out-of-band or other pre-negotiated exchange with a position server 152. For example, the initiating station 402 and other station (e.g., the trusted access point 108) may be part of a trust group formed via a cloud service (e.g., Google AP, iCloud). The initiating station 402 and the other station may be configured to establish an out-of-band exchange 110 based on encryption methods (e.g., exchanging encrypted data). The content of the out-of-band exchange 110 may include the initial-secure-token value and the secure-token-response value, randomization factors and functions, or other security information to enable secure FTM exchanges. The initial-secure-token value and the secure-token-response value may be stored in memory on the initiating station 402 and incorporated into or with the FTM Parameters IE. In another embodiment, the initiating station may obtain the initial-secure-token value and the secure-token-response value by exchanging encrypted 802.11 frames. In an embodiment, the initial-secure-token value and the secure-token-response value can be randomized. The secure-token randomization factor may be exchanged via vendor IE in the iFTMR, FTM.

At stage 704, the initiating station 402 is configured to generate a Fine Timing Measurement (FTM) Request message including the initial-secure-token value. The FTM request element may correspond to the Fine Timing Measurement Parameter element 650 (e.g., IEEE 802.11 REVmc, FIG. 8-570) with the addition of an initial-secure-token value in a secure token information element 652. In an embodiment, a secure token information element 654 may be appended on to the industry standard frame.

At stage 706, the initiating station 402 is configured to send the FTM request message to a responding station. In an example, the initiating station 402 is configured to initiate a secure FTM session by sending an iFTMR message 410 including the authenticated-source MAC address (M1'). The authenticated-source MAC address includes the initial-secure-token value. The responding station may provide an Acknowledgment (Ack) message 412 using the authenticated MAC addresses (e.g., including the initial-secure-token value).

At stage 708, the initiating station 402 is configured to receive a FTM Response message including the secure-token-response value from the responding station. In an example, the responding station 404 may provide an iFTM message 414 including the secure-token-response value. In an example, the FTM response element may correspond to the Fine Timing Measurement Parameter element 650 (e.g., IEEE 802.11 REVmc, FIG. 8-570) with the addition of the secure-token-response value in a secure token information element. As discussed, the secure token information element 654 may be appended as an additional information element to the industry standard frame. The initiating station 402 may provide the corresponding acknowledgment 416 using the initial-secure-token value.

At stage 710, the initiating station 402 is configured determine a Round Trip Time (RTT) value based at least in part on the FTM Response. In an example, the initiating station 402 computes the round-time by recording the TOA (i.e., t2) of the FTM response message received from a responding station 404 and recording the TOD of an acknowledgement frame (ACK) of the FTM response message (i.e., t3). The responding station 404 records TOD of the FTM response message (i.e., t1) and the TOA of the FTM response message received from initiating station (i.e., t4). The RTT is thus computed as RTT=[(t4-t1)−(t3-t2)]. The RTT value may be used to determine a distance between the initiating and responding stations, and subsequently for positioning of the stations.

Figure 7B:
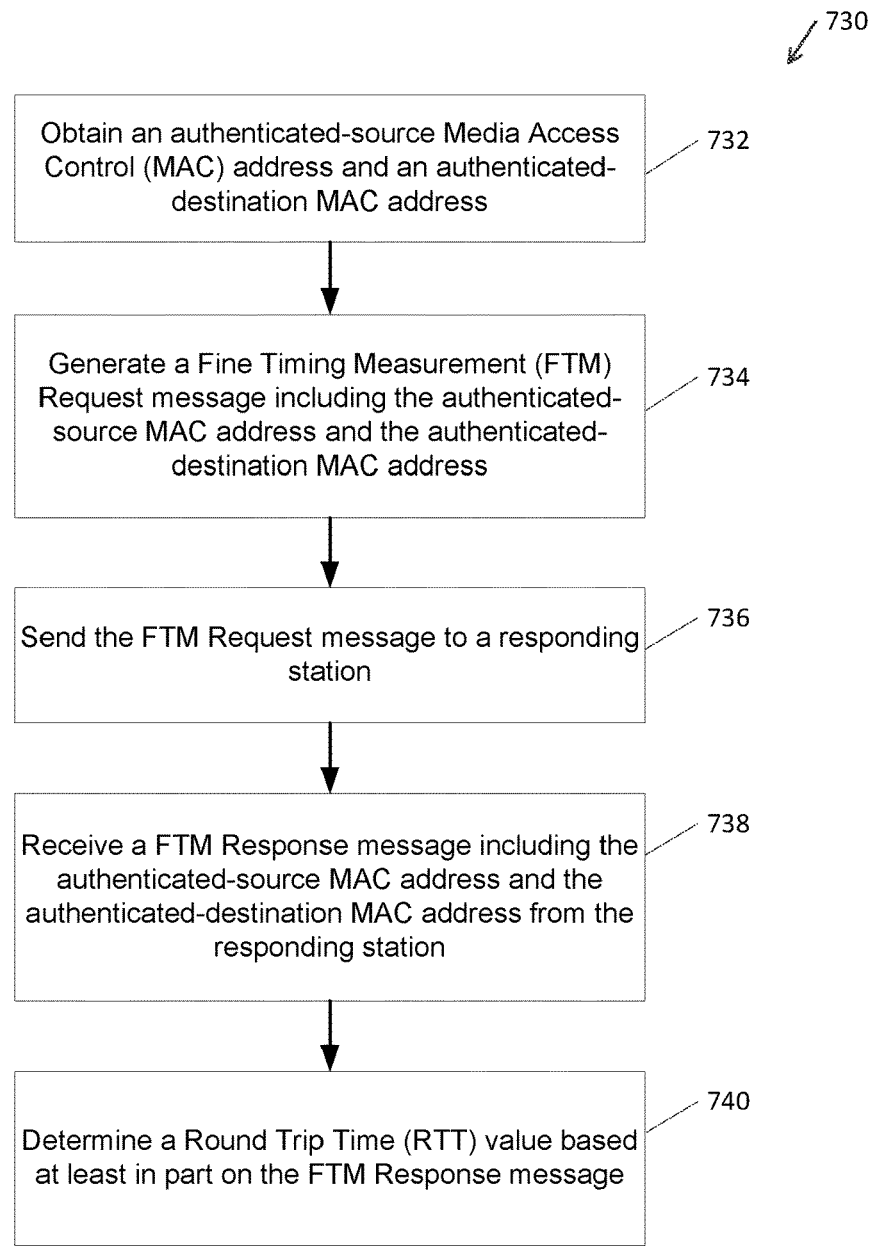
FIG. 7B is flow diagram of a process for exchanging FTM messages including authenticated Media Access Control (MAC) addresses.

In operation, referring to FIG. 7B, with further reference to FIG. 4, a process 730 for exchanging FTM messages including authenticated MAC addresses includes the stages shown. The process 730, however, is exemplary only and not limiting. The process 730 may be altered, e.g., by having stages added, removed, or rearranged.

At stage 732, an initiating station 402 is configured to obtain an authenticated-source Media Access Control (MAC) address and an authenticated-destination MAC address. In an example, the authenticated-source Media Access Control (MAC) address and the authenticated-destination MAC address may be realized by generating new source MAC address and destination MAC address combinations for the initiating station 402 and the responding station 404 (i.e., the participating stations). The participating stations may implement via hardware and/or software similar authentication algorithms to authenticate (e.g., recognize, deduce) one another's authenticate-source and authenticated-destination MAC address combinations. In an embodiment, the authenticated-source MAC address and the authenticated-destination MAC address may be randomized by out-of-band methods. For example, a randomization factor or function may be used to generate on-the-fly MAC addresses. In an embodiment, secure-tokens may be used alone or in combinations of one or more other information elements (e.g., PTSF, TOD, TOA values) to modify the original MAC address (e.g., address 1 552, address 2 554) to obtain the authenticated-source Media Access Control (MAC) address and the authenticated-destination MAC address (e.g., secure address 1 element, 562, secure address 2 element, 564). The participating stations may use the generated MAC address combination as the source and destination MAC addresses of the frames they transmit.

At stage 734, the initiating station 402 is configured to generate a Fine Timing Measurement (FTM) Request message including the authenticated-source MAC address and the authenticated-destination MAC address. The FTM request element may correspond to the Fine Timing Measurement Parameter element 650 (e.g., IEEE 802.11 REVmc, FIG. 8-570) with the authenticated-source MAC address and the authenticated-destination MAC address included in the Address 1 552 and the Address 2 554. In an example, the authenticated-source MAC address and the authenticated-destination MAC address may be the result of the functions 556, 558 (i.e., the secure address 1 562 and the secure address 2 564) in FIG. 5B. In an example, the authenticated-source MAC address and the authenticated-destination MAC address may be the result of the function 604 (i.e., the secure address 1 606 and the secure address 2 608) in FIG. 6A. Other functions or look-up tables may be used to generate the authenticated-source MAC address and the authenticated-destination MAC address.

At stage 736, the initiating station 402 is configured to send the FTM request message to a responding station. In an example, the initiating station 402 is configured to initiate a secure FTM session by sending an iFTMR message 410 including the authenticated-source MAC address (M1') and the authenticated-destination MAC address (M2'). In an example, the FTM request message includes the authenticated-source MAC address and the authenticated-destination MAC address in the MAC address header. The responding station may provide an Acknowledgment (Ack) message 412 using the authenticated MAC addresses.

At stage 738, the initiating station 402 is configured to receive a FTM Response message including the authenticated-source MAC address and the authenticated-destination MAC address from the responding station. In an example, the responding station 404 may provide an iFTM message 414 including the authenticated-source MAC address and the authenticated-destination MAC address in the MAC address header. The initiating station 402 may provide the corresponding acknowledgment 416 using the authenticated-source MAC address and the authenticated-destination MAC address in the MAC address header.

At stage 740, the initiating station 402 is configured determine a Round Trip Time (RTT) value based at least in part on the FTM Response. In an example, the initiating station 402 computes the round-time by recording the TOA (i.e., t2) of the FTM response message received from a responding station 404 and recording the TOD of an acknowledgement frame (ACK) of the FTM response message (i.e., t3). The responding station 404 records TOD of the FTM response message (i.e., t1) and the TOA of the FTM response message received from initiating station (i.e., t4). The RTT is thus computed as $RTT=[(t4-t1)-(t3-t2)]$. The RTT value may be used to determine a distance between the initiating and responding stations, and subsequently for positioning of the stations.

Embodiments may take the form of an entirely hardware embodiment, an entirely software embodiment (including firmware, resident software, micro-code, etc.) or an embodiment combining software and hardware aspects that may all generally be referred to herein as an "apparatus," "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to execute (e.g., perform) a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a non-transitory processor-readable storage medium, a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 8A:
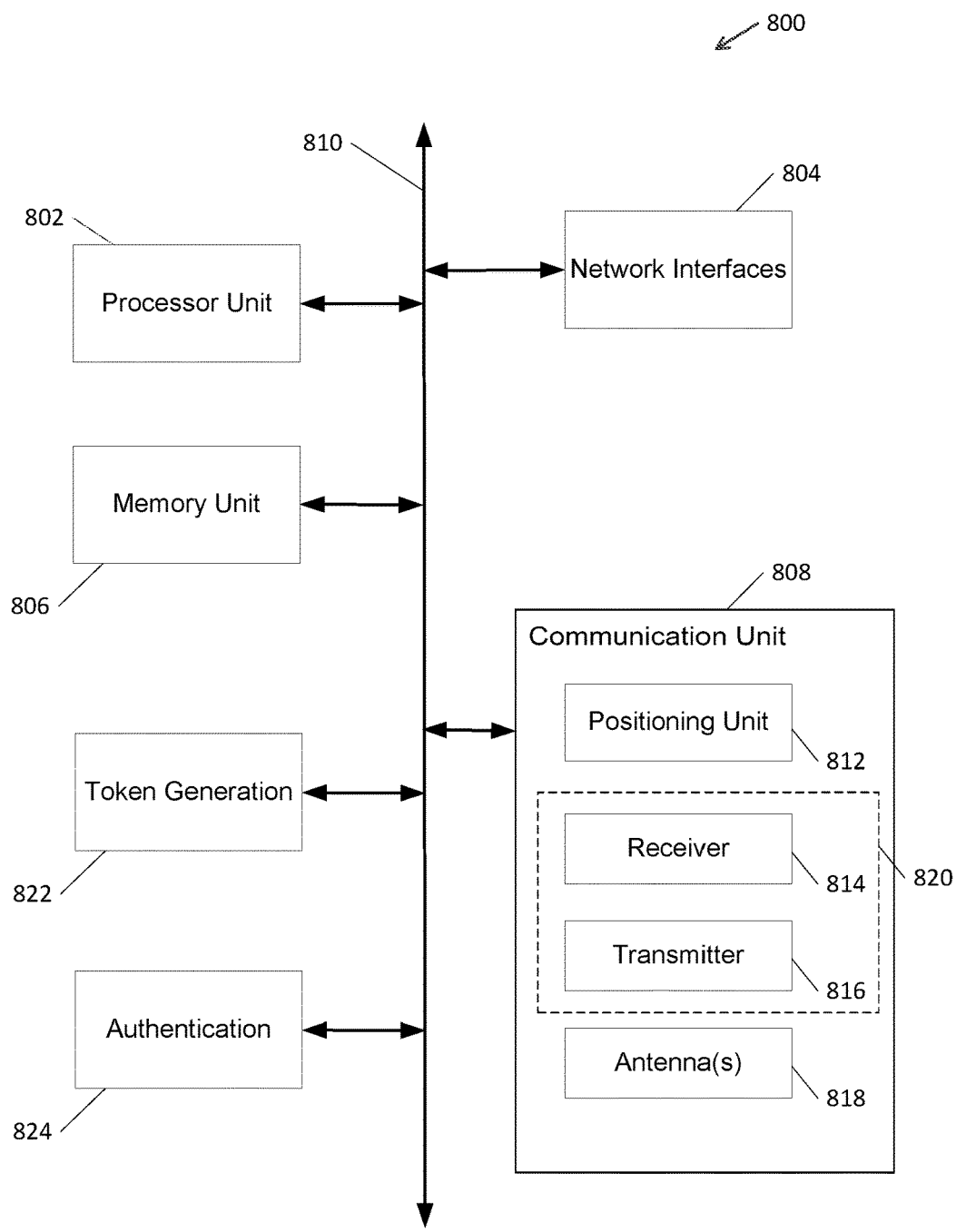
FIG. 8A a block diagram of an electronic device for use in exchanging secure FTM messages.

Referring to FIG. 8A is a block diagram of one embodiment of an electronic device 800 for use in exchanging secure FTM messages. In some implementations, the electronic device 800 may be a client station 120 embodied in a device such as a notebook computer, a tablet computer, a netbook, a mobile phone, a smart phone, a gaming console, a personal digital assistant (PDA), or an inventory tag. The electronic device 800 may be other electronic systems such as a Home Node B (HNB) device with a wireless transceiver and positioning capabilities (e.g., a type of access point). The electronic device 800 includes a processor unit 802 (possibly including multiple processors, multiple cores, multiple nodes, and/or implementing multi-threading, etc.). The electronic device 800 includes a memory unit 806. The memory unit 806 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 800 also includes a bus 810 (e.g., PCI, ISA, PCI-Express, Hyper-Transport®, InfiniBand®, NuBus, AHB, AXI, etc.), and network interfaces 804 that include at least one of a wireless network interface (e.g., a WLAN interface, a Bluetooth® interface, a WiMAX interface, a ZigBee® interface, a Wireless USB interface, etc.) and a wired network interface (e.g., an Ethernet interface, etc.).

The electronic device 800 also includes a communication unit 808. The communication unit 808 comprises a positioning unit 812, a receiver 814, a transmitter 816, and one or more antennas 818. The transmitter 816, the antennas 818, and the receiver 814 form a wireless communication module (with the transmitter 816 and the receiver 814 being a transceiver 820). The transmitter 816 and the receiver 814 are configured to communicate bi-directionally with one or more client stations and other access points via a corresponding antenna 818. In some embodiments, the electronic device 800 can be configured as a WLAN station with positioning determining capabilities (e.g., a type of access point). The positioning unit 812 can utilize the secure FTM session information exchanged with the access points to determine RSS and/or TDOA timing information associated with the access points. The positioning unit 812 can determine the position of the electronic device 800 based, at least in part, on the TDOA timing information, and the AP position information, as described above. In an example, the electronic device 800 includes a token generation module 822 configured to obtain secure-tokens (e.g., via out-of-band exchanges), and generate the authenticated-source MAC address and the authenticated-destination MAC address as described. An authentication module 824 may be configured to authenticate (e.g., verify) secure-tokens and MAC address received in a secure FTM exchange. For example, the authentication module 824 may include authentication algorithms or other software elements to compare MAC address to look-up table values, or to reverse the token generation processes such as indicated in Functions 1-10 above. Further, in this embodiment, the access points can use their processing capabilities to execute their respective operations described above. Any one of these functionalities may be partially (or entirely) implemented in hardware and/or on the processor unit 802. For example, the functionality may be implemented with an application specific integrated circuit, in logic implemented in the processor unit 802, in a co-processor on a peripheral device or card, etc. Further, realizations may include fewer or additional components not illustrated in FIG. 8A (e.g., display screen, video cards, audio cards, additional network interfaces, peripheral devices, etc.). The processor unit 802, the memory unit 806, and the network interfaces 804 are coupled to the bus 810. Although illustrated as being coupled to the bus 810, the memory unit 806 may be coupled to the processor unit 802.

Figure 8B:
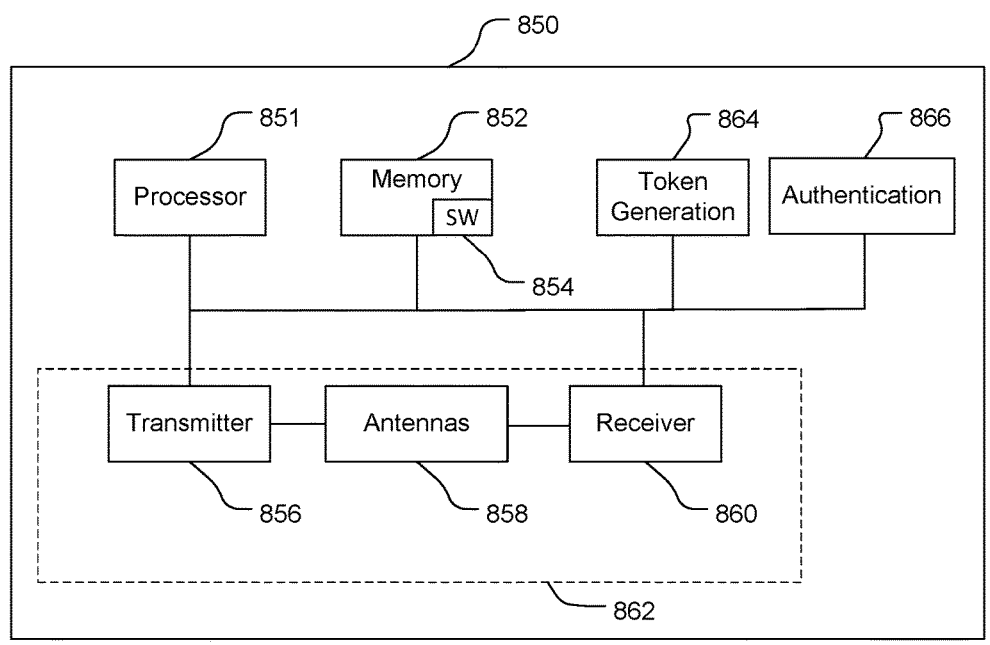
FIG. 8B is a block diagram of an exemplary wireless transceiver.

Referring to FIG. 8B, an example of a wireless transceiver system such as a station 850 comprises a computer system including a processor 851, memory 852 including software 854, a transmitter 856, antennas 858, and a receiver 860. The access points 102, 104, 106, 108 may be configured as the station 850 of FIG. 8B. The transmitter 856, antennas 858, and the receiver 860 form a wireless communication module (with the transmitter 856 and the receiver 860 being a transceiver 862). The transmitter 856 is connected to one of the antennas 858 and the receiver 860 is connected to another of the antennas 858. Other example stations may have different configurations, e.g., with only one antenna 858, and/or with multiple transmitters 856 and/or multiple receivers 860. The transmitter 856 and the receiver 860 are configured such that the station 850 can communicate bi-directionally with the client station 120 via the antennas 858. The processor 851 is preferably an intelligent hardware device, e.g., a central processing unit (CPU) such as those made by ARM®, Intel® Corporation, or AMD®, a microcontroller, an application specific integrated circuit (ASIC), etc. The processor 851 could comprise multiple separate physical entities that can be distributed in the station 850. The memory 852 includes random access memory (RAM) and read-only memory (ROM). The memory 852 is a processor-readable storage medium that stores the software 854 which is processor-readable, processor-executable software code containing processor-readable instructions that are configured to, when executed, cause the processor 851 to perform various functions described herein (although the description may refer only to the processor 851 performing the functions). Alternatively, the software 854 may not be directly executable by the processor 851 but configured to cause the processor 851, e.g., when compiled and executed, to perform the functions. In an example, the station 850 includes a token generation module 864 configured to obtain secure-tokens (e.g., via out-of-band exchanges), and generate the authenticated-source MAC address and the authenticated-destination MAC address as described. An authentication module 866 may be configured to authenticate (e.g., verify) secure-tokens and MAC address received in a secure FTM exchange. For example, the authentication module 866 may include authentication algorithms or software elements to compare MAC address to look-up table values or to reverse the token generation processes such as indicated in Functions 1-10 above.

While the embodiments are described with reference to various implementations and exploitations, it will be understood that these embodiments are illustrative and that the scope of the inventive subject matter is not limited to them. In general, techniques for positioning with access network query protocol neighbor reports as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

As used herein, including in the claims, unless otherwise stated, a statement that a function or operation is "based on" an item or condition means that the function or operation is based on the stated item or condition and may be based on one or more items and/or conditions in addition to the stated item or condition.

Further, more than one invention may be disclosed.

The invention claimed is:

1. A wireless transceiver system for providing a secure Fine Timing Measurement (FTM) exchange, comprising:
a memory;
at least one processor operably coupled to the memory and configured to:
obtain an initial-secure-token value, a secure-token-response value, and randomization function information from a position server via an out-of-band signal;
determine a randomization function based at least in part on the randomization function information;
determine an authenticated-source MAC address based on an original source MAC address and the randomization function;
determine an authenticated-destination MAC address based on an original destination MAC address and the randomization function; and
generate a FTM Request message including the initial-secure-token value, the authenticated-source MAC address, the authenticated-destination MAC address, and an indication identifying the randomization function;
a transmitter to send the FTM Request message to a responding station; and
a receiver to receive a FTM Response message including the secure-token-response value from the responding station;
wherein the at least one processor is configured to determine a Round Trip Time (RTT) value based at least in part on the FTM Response message.

2. The wireless transceiver system of claim 1 wherein the initial-secure-token value and the secure-token-response value are equal.

3. The wireless transceiver system of claim 1 wherein the initial-secure-token value and the secure-token-response value are randomized.

4. The wireless transceiver system of claim 1 wherein the at least one processor is further configured to determine a position of the wireless transceiver system based at least in part on the RTT value.

5. A method for participating in a secure Fine Timing Measurement (FTM) exchange, comprising:
obtaining an authenticated-source Media Access Control (MAC) address and an authenticated-destination MAC address comprising:
determining the authenticated-source MAC address based on an original source MAC address, a randomization function, and at least one of a Time of Departure (TOD) and a Time of Arrival (TOA) of one or more messages exchanged via one or more out of band signals; and
determining the authenticated-destination MAC address based on an original destination MAC address, the randomization function, and at least one of the TOD and the TOA of the one or more messages;
generating a FTM Request message including the authenticated-source MAC address and the authenticated-destination MAC address;
sending the FTM Request message to a responding station;
receiving a FTM Response message including the authenticated-source MAC address and the authenticated-destination MAC address from the responding station; and
determining a Round Trip Time (RTT) value based at least in part on the FTM Response message.

6. The method of claim 5 wherein the FTM Request message comprises the at least one FTM parameter field information element comprising a Partial Timing Synchronization Function (PTSF) field.

7. The method of claim 5 further comprising receiving a secure token via an out-of-band exchange with a position server, and wherein the determining the randomization function is further based on the secure token.

8. The method of claim 5, wherein determining the authenticated-source MAC address based on the original source MAC address and the randomization function further comprises:
performing a bitwise logical operation on the original source MAC address and a least one of the TOD and the TOA.

9. The method of claim 5, wherein determining the authenticated-destination MAC address based on the original destination MAC address and the randomization function further comprises:
performing a bitwise logical operation on the original destination MAC address and a least one of the TOD and the TOA.

10. An apparatus for providing a secure Fine Timing Measurement (FTM) exchange, comprising:
means for obtaining an initial-secure-token value, a secure-token-response value, and randomization function information from a position server via an out-of-band signal;
means for determining a randomization function based at least in part on the randomization function information;
means for determining an authenticated-source MAC address based on an original source MAC address and the randomization function; and
means for determining an authenticated-destination MAC address based on an original destination MAC address and the randomization function;
means for generating a FTM Request message including the initial-secure-token value, the authenticated-source MAC address, the authenticated-destination MAC address, and an indication identifying the randomization function;
means for sending the FTM Request message to a responding station;
means for receiving a FTM Response message including the secure-token-response value from the responding station; and
means for determining a Round Trip Time (RTT) value based at least in part on the FTM Response message.

11. The apparatus of claim 10 wherein the initial-secure-token value and the secure-token-response value are equal.

12. The apparatus of claim 10 wherein the initial-secure-token value and the secure-token-response value are randomized.

13. The apparatus of claim 10 further comprising means for determining a position based at least in part on the RTT value.

14. A non-transitory processor-readable storage medium comprising instructions for participating in a secure Fine Timing Measurement (FTM) exchange, comprising:
  code for obtaining an authenticated-source Media Access Control (MAC) address and an authenticated-destination MAC address comprising:
    code for determining an authenticated-source MAC address based on an original source MAC address, a randomization function, and at least one of a Time of Departure (TOD) and a Time of Arrival (TOA) of one or more messages exchanged via one or more out of band signals; and
    code for determining an authenticated-destination MAC address based on an original destination MAC address, the randomization function, and at least one of the TOD and the TOA of the one or more messages;
  code for generating a FTM Request message including the authenticated-source MAC address and the authenticated-destination MAC address;
  code for sending the FTM Request message to a responding station;
  code for receiving a FTM Response message including the authenticated-source MAC address and the authenticated-destination MAC address from the responding station; and
  code for determining a Round Trip Time (RTT) value based at least in part on the FTM Response message.

15. The non-transitory processor-readable storage medium of claim 14 wherein the at least one FTM parameter field information element is a Partial Timing Synchronization Function (PTSF) field.

16. The non-transitory processor-readable storage medium of claim 14 further comprising code for receiving a secure token via an out-of-band exchange with a position server, and wherein the code for determining the randomization function is further based on the secure token.

17. A wireless transceiver system for participating in a secure Fine Timing Measurement (FTM) exchange, comprising:
  a memory;
  at least one processor operably coupled to the memory and configured to:
    obtain an authenticated-source Media Access Control (MAC) address and an authenticated-destination MAC address comprising:
      determine the authenticated-source MAC address based on an original source MAC address, a randomization function, and at least one of a Time of Departure (TOD) and a Time of Arrival (TOA) of one or more messages exchanged via one or more out of band signals; and
      determine the authenticated-destination MAC address based on an original destination MAC address, the randomization function, and at least one of the TOD and the TOA of the one or more messages;
    generate a FTM Request message including the authenticated-source MAC address and the authenticated-destination MAC address;
    send the FTM Request message to a responding station;
    receive a FTM Response message including the authenticated-source MAC address and the authenticated-destination MAC address from the responding station; and
    determine a Round Trip Time (RTT) value based at least in part on the FTM Response message.

18. The wireless transceiver system of claim 17 wherein the at least one FTM parameter field information element is a Partial Timing Synchronization Function (PTSF) field.

19. The wireless transceiver system of claim 17 wherein the at least one processor is configured to receive a secure token via an out-of-band exchange with a position server, wherein the determine the randomization function is further based on the secure token.

* * * * *